United States Patent
Kobayashi et al.

(10) Patent No.: US 7,295,240 B2
(45) Date of Patent: Nov. 13, 2007

(54) ELECTRONIC APPARATUS

(75) Inventors: Takashi Kobayashi, Kanagawa (JP); Masamichi Ito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1027 days.

(21) Appl. No.: 10/226,856

(22) Filed: Aug. 23, 2002

(65) Prior Publication Data

US 2003/0048481 A1    Mar. 13, 2003

(30) Foreign Application Priority Data

Sep. 7, 2001  (JP)  ............................. 2001-272434
Aug. 2, 2002  (JP)  ............................. 2002-226161

(51) Int. Cl.
*H04N 5/222* (2006.01)
*H04N 7/14* (2006.01)

(52) U.S. Cl. .............................. 348/333.06; 348/14.07; 348/14.01; 348/333.01

(58) Field of Classification Search ........... 348/333.06, 348/14.01–14.09, 14.1; 455/556.1
See application file for complete search history.

(56) References Cited

U.S. PATENT DOCUMENTS 5,550,754 A * 8/1996 McNelley et al. ....... 348/14.01
7,046,286 B1 * 5/2006 Kobayashi et al. .... 348/333.06
7,046,287 B2 * 5/2006 Nishino et al. ........ 348/333.06
7,084,897 B2 * 8/2006 Ejima et al. ............. 348/14.01
7,148,911 B1 * 12/2006 Mitsui et al. ............ 348/14.01

FOREIGN PATENT DOCUMENTS

CN    1302152 A    7/2001

* cited by examiner

*Primary Examiner*—Ngoc-Yen Vu
*Assistant Examiner*—Gregory V Madden
(74) *Attorney, Agent, or Firm*—Cowan, Liebowitz & Latman, P.C.

(57) ABSTRACT

An electronic apparatus wherein, when a video camera is employed as a TV telephone or a portable telephone is employed as a TV telephone and when the direction of the display face of an LCD panel is directed (the display direction) is the opposite of that of a lens (the photographing direction), the image of an object photographed through the lens is displayed as the main picture on the LCD panel, and wherein, when the direction of the display face of the LCD panel is directed (the display direction) is the same as that of the lens (the photographing direction), an image transmitted by a communication partner is displayed as the main picture on the LCD panel.

15 Claims, 10 Drawing Sheets

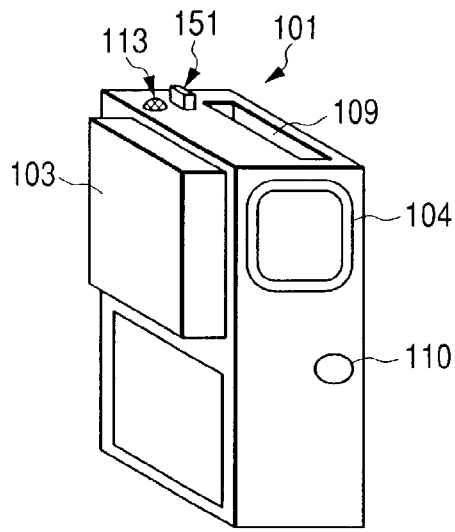
FIG. 2
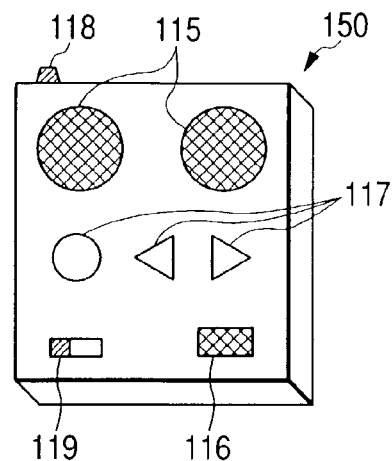
FIG. 3
FIG. 4
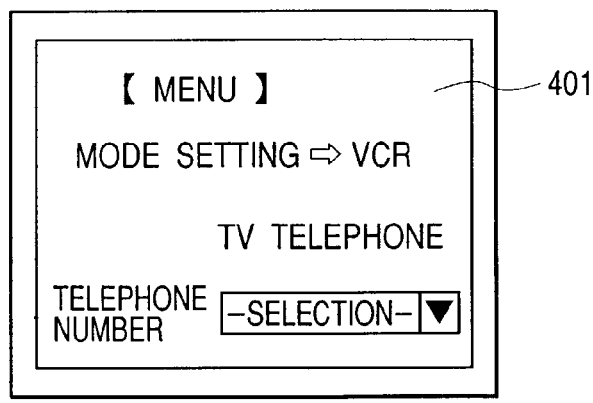
FIG. 5
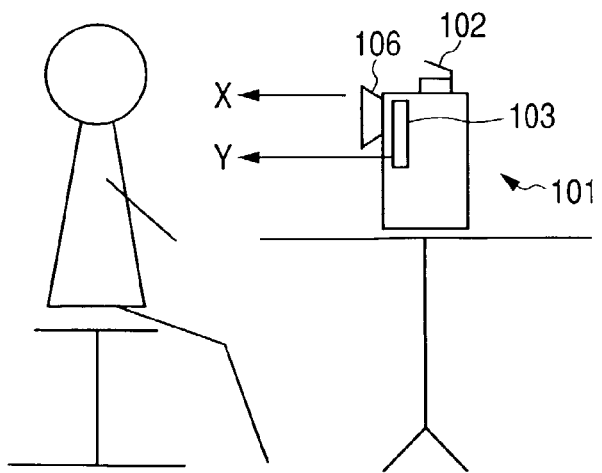

ELECTRONIC APPARATUS

BACKGROUND OF THE INVENTION

1. Field of the Invention

The present invention relates to an electronic apparatus that can transmit/receive image data and audio data, an image pickup apparatus such as a video camera, a portable communication apparatus including an image pickup unit, and an image display control method and a program therefor, all of which are appropriate for the implementation of a TV telephone function.

2. Related Background Art

Portable communication terminals on which cameras are mounted have recently been provided. Communication terminals of this are employed for the transmission to friends of e-mails including static images obtained by the cameras, or for images for the standby screens of the liquid crystal displays of the terminals.

Also proposed is a camera that employs a built-in communication function for providing data communication with the outside. FIG. 13 is a diagram showing an example of this type of camera, a video camera 301. The video camera 301 comprises: a lens 303, a liquid crystal display panel 304, on which is displayed an image obtained by the lens 303, a photographing/recording trigger button 305, a battery 306, an electronic viewfinder 307, a data communication unit 308, by which a radio communication function relative to an external system is implemented, and various manipulation units 309.

When a portable communication terminal having a built-in camera or video camera that can communicate with the outside is employed, a so-called TV telephone function for exchanging image data and audio data can be provided. In this case, the image of a user can be obtained by the built-in camera for portable communication terminal or by the video camera, and the data for the photograph can be transmitted to a communication partner, or an image received from the communication partner can be displayed either on the liquid crystal display of the portable communication terminal or on the liquid crystal display of the video camera.

However, when the TV telephone function is carried out by using the portable communication terminal or the video camera, the employability thus provided is not fully satisfactory. For example, when the TV telephone function is implemented by using the video camera 301 during a telephone call, merely an image received from the communication partner is displayed on the liquid crystal display panel 304. This configuration is satisfactory only when the user is photographed by the fixed video camera, and the obtained image is transmitted to the communication partner. However, when the image of a scene around the user or of surrounding persons is to be transmitted to the communication partner, the liquid crystal display panel 304 can not be employed for the adjustment and the framing of a photograph.

SUMMARY OF THE INVENTION

An object of the present invention is to solve the above described problems.

Another object of the invention is to improve the employability of an electronic apparatus, such as a portable communication apparatus or an image pickup apparatus, when a TV telephone function is carried out by using this electronic apparatus.

As a preferred embodiment for such objects, according to the present invention, an electronic apparatus comprises:
photographing means for photographing an object;
display means for displaying an image obtained by the photographing means and an external image obtained from the outside;
movement means for moving at least one of the photographing means and the display means; and
display control means for, when the photographing means is obtaining an image and the external image is being received, switching images to be displayed on the display means, in accordance with the positional relationship between the photographing means and the display means.

Further, an image pickup apparatus according to the present invention comprises:
photographing means for photographing an object;
reception means for receiving an external image signal;
display means for displaying an image obtained by the photographing means and an image received by the reception means, and for changing the direction of the display, while pivoting, at the least, is included in part of an operation that is performed; and
display control means for, when the photographing means is obtaining an image and when the reception means is receiving the image, switching images to be displayed on the display means in accordance with the display direction of the display means.

Furthermore, a portable communication apparatus according to the present invention comprises:
photographing means for photographing an object and for changing a photographing direction, while pivoting, at the least, is included in part of an operation that is performed;
transmission/reception means for exchanging a image signal and an audio signal with the outside;
display means for displaying an image obtained by the photographing means and an image received by the transmission/reception means; and
display control means for, when the photographing means is obtaining a photograph and the reception means is exchanging the image signal and the audio signal with the outside, switching images to be displayed on the display means in accordance with the photographing direction of the photographing means.

In addition, an image display control method according to the present invention comprises:
a photographing step of photographing an object by using an image pickup apparatus;
a reception step of receiving an external image signal;
a display step of displaying, on a display device, an image obtained at the photographing step and an external image that is received from the outside; and
a control step of, when photographing is being performed at the photographing step and the external image is being received at the reception step, switching images to be displayed at the display step in accordance with the positional relationship between the photographing direction of the image pickup apparatus and the display direction of the display device.

Moreover, an image display control program according to the present invention comprises:
a photographing step of photographing an object using an image pickup apparatus;
a reception step of receiving an external image signal;
a display step of displaying, on a display device, an image obtained at the photographing step and an external image received from the outside; and a control step of, when photographing is being performed at the photographing step and the external image is being received at the reception step, switching images to be displayed at the display step, in accordance with the positional relationship between the photographing direction of the image pickup apparatus and the display direction of the display device.

Still other objects of the present invention and the advantages thereof will become fully apparent during the presentation of the following detailed description of the embodiments, given while referring to the accompanying drawings.

BRIEF DESCRIPTION OF THE DRAWINGS

FIG. 2 is a rear view of the video camera 101 wherein a liquid crystal display panel 103 is closed;

FIG. 3 is a diagram showing a remote controller 150 for the video camera 101;

FIG. 4 is a diagram showing a liquid crystal display panel 103 on which a menu is displayed;

FIG. 5 is a diagram showing the basic usage of the video camera 101 that is employed as a TV telephone;

DETAILED DESCRIPTION OF THE PREFERRED EMBODIMENTS

The preferred embodiments of the present invention will hereinafter be described in detail while referring to the accompanying drawings.

First Embodiment

An image pickup apparatus in accordance with a first embodiment of the present invention will now be described.

Figure 1A:
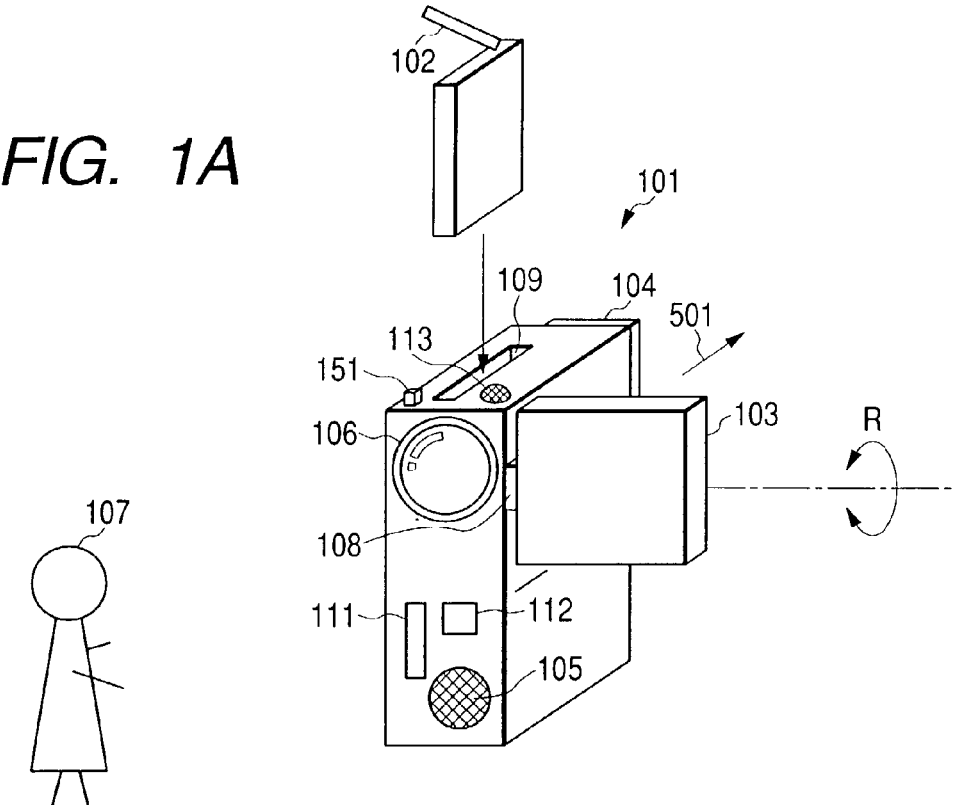
FIGS. 1A and 1B are diagrams showing the external appearance of a video camera 101 and the usage thereof according to a first embodiment of the present invention.
Figure 1B:
Figure 1B:
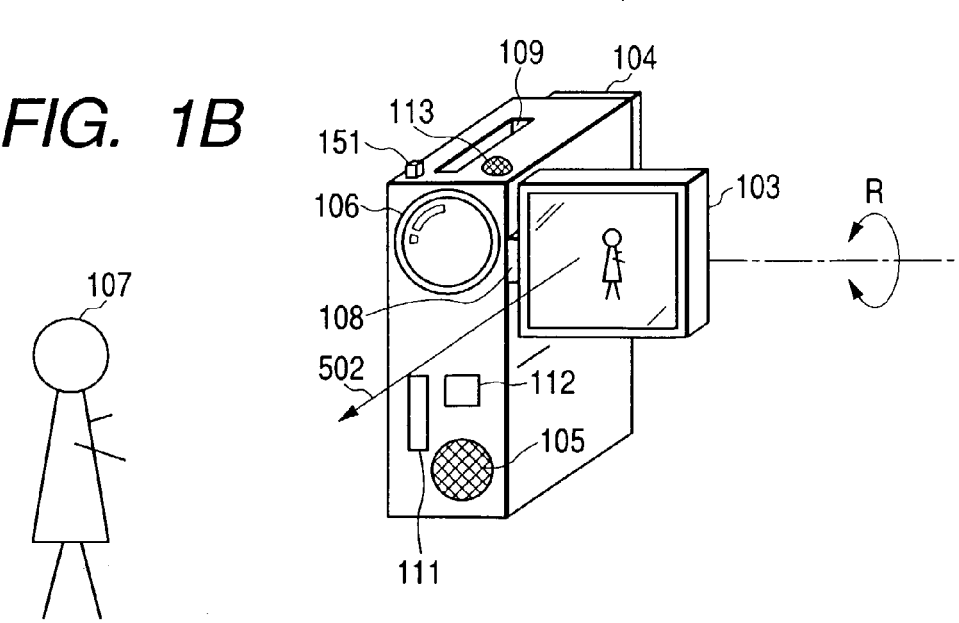

FIGS. 1A, 1B and 2 are diagrams showing the external appearance and the usage of a video camera 101 that, in accordance with this embodiment, is an image pickup apparatus. This video camera 101 can be employed as a communication terminal and its TV telephone function can be implemented by mounting on it a detachable memory card type modem 102. The memory card modem 102 enables the communication terminal to use a radio communication system that directly employs a telephone network, such as a portable communication terminal network, or a system that for short-distance radio communication employs Bluetooth to communicate with another telephone set across a network.

The video camera 101 further includes a liquid crystal display panel (LCD panel) 103, a viewfinder 104, a built-in loudspeaker 105, a lens 106, a hinge 108 for pivoting the LCD panel 103, a memory card slot 109 into which the memory card modem 102 is inserted, a trigger button 110 for instructing the starting or the stopping of a photographing process, a menu switch 111, and a built-in microphone 113.

An object 107 represents a person that is to be photographed.

As is shown in FIGS. 1A and 1B, the hinge 108 permits the LCD panel 103 not only to be pivoted in the direction indicated by an arrow R but also, as is shown in FIGS. 1A, 1B and 2, to be opened and closed.

The menu switch 111 can be manipulated to select and set a video camera (VCR) mode during which the video camera 101 performs a normal photographing operation, or to select and set a TV telephone mode during which the video camera 101 can be employed as a TV telephone. In addition, as is shown in FIG. 4, in consonance with the manipulation of the menu switch 111, a menu screen 401 can be displayed on the LCD panel 103 and can be employed by a user to choose the mode to be used. Subsequently, when the TV telephone mode is selected, the user can employ the menu screen 401, on which are displayed telephone numbers and communication destinations previously registered and stored in a memory 218 (FIG. 7) of the video camera 101, to select and dial a telephone number. Furthermore, number keys (ten keys) may be provided on the main body of the video camera 101 for the direct entry of a telephone number by the user.

The video camera 101 further includes a button 112 used to set the on-hook state (calling state) at the time a call is transmitted or received in the TV telephone mode. An indicator (e.g., the color of an LED) for the button 112 is altered to reflect the calling and the non-calling states.

Radio communication established using a remote controller 150 shown in FIG. 3 can also be employed to control the video camera 101. Included in the video camera 101 are a radio transmission/reception circuit and an antenna 151 for communicating with the remote controller 150 and exchanging various signals.

The remote controller 150 in FIG. 3 will now be described. The remote controller 150 includes remote loudspeakers 115, a remote microphone 116, command keys 117, such as an on-hook button and a trigger button, that are used for various operations performed by the video camera 101, a radio transmission/reception antenna 118 for exchanging audio signals and various command signals with the video camera 101, and a power switch 119 for the remote controller 150.

An audio signal received from the video camera 101 can be output by the remote loudspeakers 115 of the remote controller 150, and an audio signal collected at the remote microphone 116 can be transmitted to the video camera 101.

An explanation will now be given for the normal photographing operation performed by the video camera 101 in the VCR mode.

A user selects the VCR mode by manipulating the menu switch 111. The operating switch (not shown) of the video camera can be employed to switch, while in the VCR mode, between the VTR mode for reproduction and the camera mode for photography, and in this embodiment, the camera mode is selected.

When the user depresses the trigger button 110 while directing the lens 106 toward the object 107, the photographing of the object 107 and the recording are begun. The image thus obtained is displayed on the display face of the LCD panel 103 or on the viewfinder 104. For example, when the LCD panel 103 is closed, as is shown in FIG. 2, the obtained image is displayed on the viewfinder 104, while when the LCD panel 103 is open, as is shown in FIGS. 1A and 1B, the obtained image is displayed on the display face of the LCD panel 103.

As is described above, the LCD panel 103 is pivotable at the hinge 108, and as is shown in FIG. 1A, the direction in which the display face of the LCD panel 103 is directed (the display direction) is toward the viewfinder 104, which is the direction opposite (arrow 501) to that in which the lens 106 is directed (the photographing direction).

When in this state the LCD panel 103 is pivoted close to 180 degrees, as is shown in FIG. 1B, the direction in which the display face of the LCD panel 103 is directed (the display direction) is toward the object 107, the same direction (arrow 502) as that in which the lens 106 is directed (the photographing direction). In this state, which is called a facing photographing state, an upside-down process and a mirror-image process are performed for the obtained image to prevent the display of an inverted image on the LCD panel 103.

This facing photographing state can be employed when a child is being photographed and the photographer, to draw the child's attention to the lens 106, pivots the LCD panel 103 so that the child can see the image displayed thereon.

An explanation will now be given for an example wherein the TV telephone function is implemented by using the video camera 101. In this case, the memory card modem 102 is inserted into the memory card slot 109, and the menu switch 111 is manipulated to set the TV telephone mode.

When the TV telephone mode is set, by using the memory card modem 102, image data and audio data can be exchanged across a telephone line.

When a telephone call is received, a user is notified the call has arrived by the generation of an arrival tone, the display of an icon on the screen of the LCD panel 103, or the blinking of the button 112.

An image received from a communication partner can be displayed on the LCD panel 103, and sound can be output by the loudspeaker 105 or the remote loudspeakers 115.

For image transmission, an image obtained through the lens 106 can be processed and transmitted, and the sound can be collected by the microphone 113 or the remote microphone 116 and transmitted to the communication device of the partner.

Since, as the basic usage in the TV telephone mode, an image of the user must be transmitted to the communication partner, as is shown in FIG. 5, the video camera 101 is directed toward the user (arrow X), while the LCD panel 103 is pivoted so that its display face also faces the user (arrow Y) in the facing photographing state. Thus, while speaking, the user can view the communication partner's image presented on the display face.

Furthermore, in addition to the basic usage, various other photographing uses and displays are available in the TV telephone mode of the video camera 101 in this embodiment. The usage of the video camera 101 in the TV telephone mode will now be described while referring to FIGS. 6A, 6B and 6C.

Figure 6A:
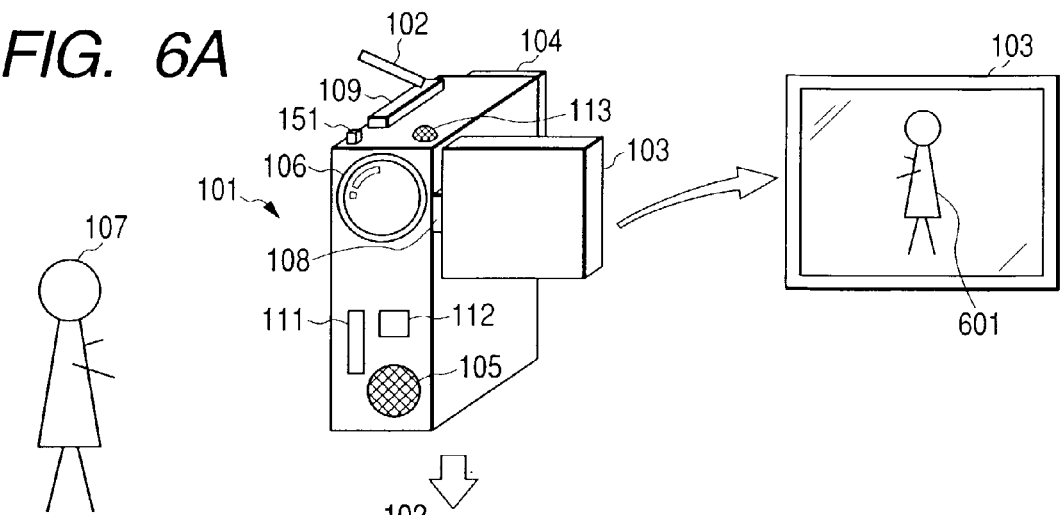
FIG. 6A is a diagram showing the usage of the video camera 101 that is employed as a TV telephone, wherein an object is photographed while the display face of the liquid crystal display panel 103 is directed away from the object being photographed.

In the state in FIG. 6A, while photographing during the course of a telephone call, the positioning of the display face of the LCD panel 103 (the display direction), i.e., toward the viewfinder 104, is the opposite of that of the lens 106 (the photographing direction). In this state, the image displayed on the LCD panel 103 is an image 601 of the object 107 that is obtained through the lens 106. Further, sound in the vicinity of the object 107 is collected by the microphone 113 and is transmitted to the communication partner, and sound received from the communication partner is output by the loudspeaker 105.

Figure 6B:
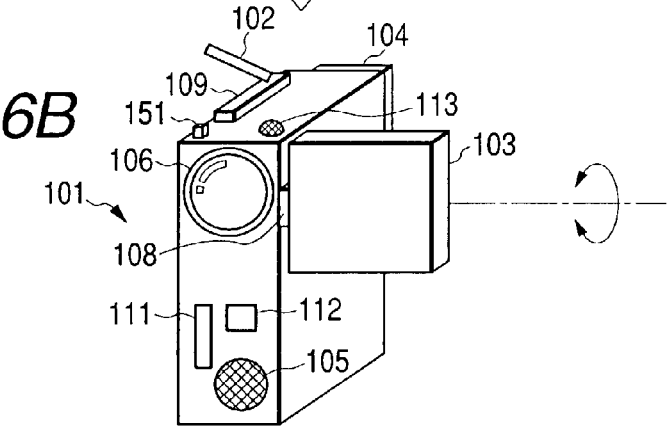
FIG. 6B is a diagram showing the state wherein the liquid crystal display panel 103 of the video camera 101 is pivoted.

The LCD panel 103 in the state in FIG. 6A is then pivoted 180 degrees at the hinge 108, as is shown in FIG. 6B.

Figure 6C:
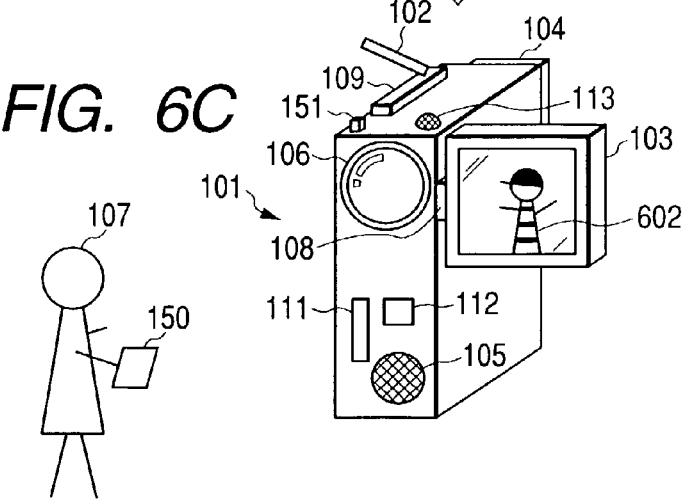
FIG. 6C is a diagram showing the usage of the video camera 101 that is employed as a TV telephone, wherein an object is photographed by remote control while the display face of the liquid crystal display panel 103 is directed toward the object being photographed.

Then, as is shown in FIG. 6C, as a result of the LCD panel 103 being pivoted close to 180 degrees, the directions in which the display face of the LCD panel 103 (the display direction) and the lens 106 (the photographing direction) face are the same. In this state (the facing photographing state), the image displayed on the LCD panel 103 is an image 602 received from the communication partner. At this time, sound in the vicinity of the communication partner is collected and is transmitted to the user, and the received sounds are output by the loudspeaker 105.

Furthermore, in the situation in FIG. 6C, wherein the object 107 employs the remote controller 150 to manipulate the video camera 101 in the facing photographing state, or in all situations during which the remote controller 150 is used, the object 107 can manipulate the command keys 117 by turning on the power switch 119 of the remote controller 150, and can then perform various remote control processes, such as an on-hook for the video camera 101. As for sound, the object 107 can also manipulate the remote controller 150 to use the remote microphone 116 to collect sound in his or her vicinity that is then transmitted, using radio communication, from the transmission/reception antenna 118 to the antenna 151 of the video camera 101, and from there to the communication partner. In addition, the object 107 can manipulate the remote controller 150 so that when sound from the communication partner is received at the video camera 101 it is transmitted, using radio communication, by the antenna 151 to the radio transmission/reception antenna 118 of the remote controller 150 and is output by the remote loudspeakers 115.

As is described above, when the LCD panel 103 has been pivoted, the image displayed on the LCD panel 103 is changed in accordance with the current position of the LCD panel 103 (the display direction), and can be either the image photographed by the video camera 101 or the image transmitted by the communication partner. That is, in the state in FIG. 6C, the user and the communication partner can each, while conversing, view an image of the other. In the state in FIG. 6A, the images of the area surrounding the situation of the user and a person nearby are transmitted to the communication partner. In this case, the photographer can perform framing while viewing an image displayed on the LCD panel 103.

Figure 7:
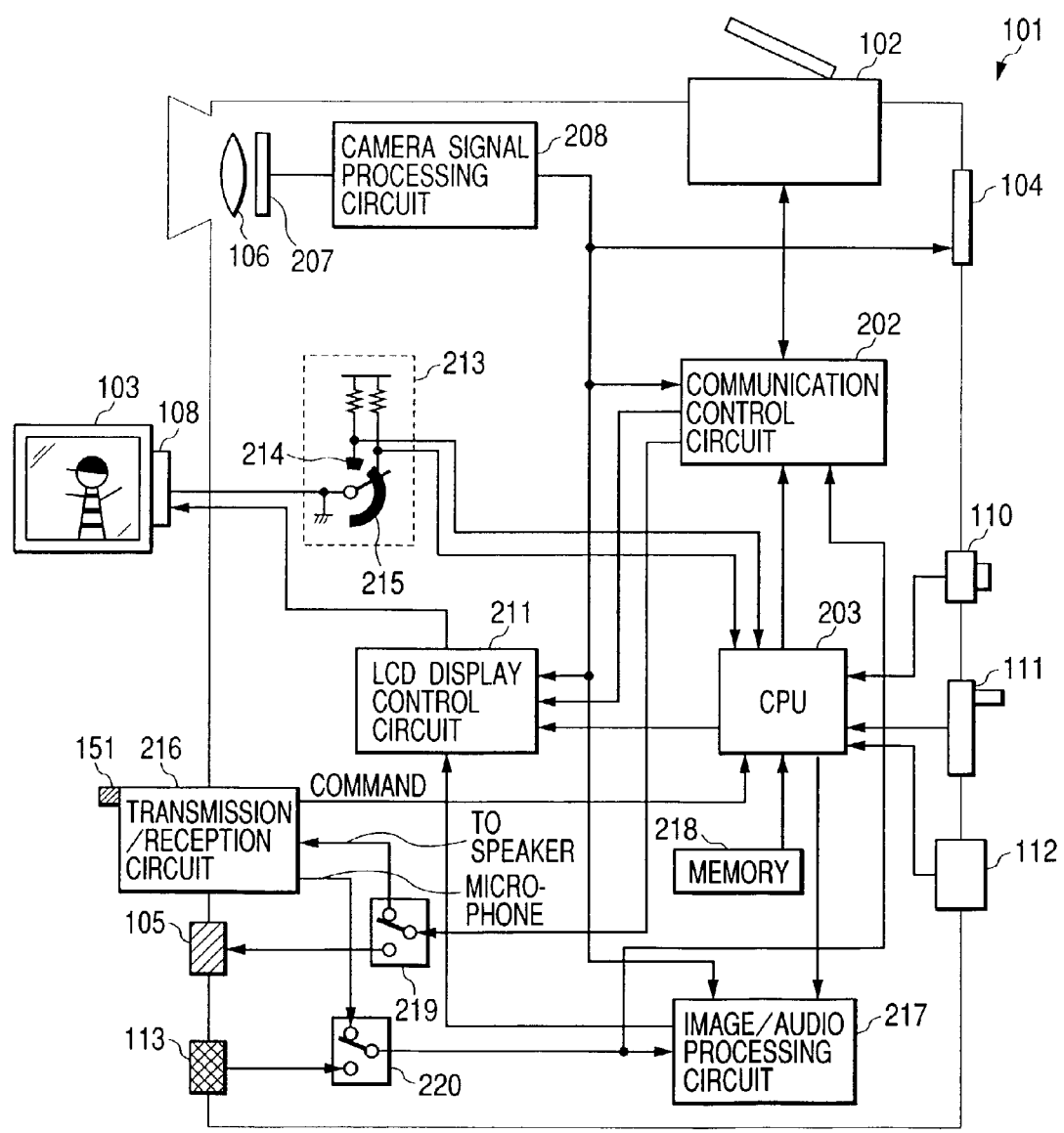
FIG. 7 is a block diagram showing the configuration of the video camera 101.

FIG. 7 is a block diagram showing the video camera 101 according to this embodiment. In the following explanation, the same reference numerals as are used for previously described components are employed to denote corresponding or identical components.

The memory card modem 102 is controlled by a communication control circuit 202. In accordance with an instruction issued by a CPU 203, the communication control circuit 202 initializes the memory card modem 102, establishes/terminates a communication connection, exchanges image data and audio data, and encodes/decodes image data for communication.

In the TV telephone mode, the image data received from a communication partner is decoded by the communication control circuit 202, and is converted into an appropriate display form by an LCD display control circuit 211. The resultant data is then displayed on the LCD panel 103. Further, the audio data received from the communication partner is transmitted across the communication control circuit 202 to a selection circuit 219, and is output by the remote loudspeakers 115, or is output by a built-in speaker 105 through a transmission/reception circuit 216.

An image signal obtained by a photographing device 207 through the lens 106 is produced as a camera image by a camera signal processing circuit 208.

The camera image can be displayed on the viewfinder 104 or on the LCD panel 103 through the LCD display control circuit 211. For communication in the TV telephone mode, the camera image is encoded by the communication control circuit 202 and the obtained data is transmitted to the outside by the modem 102.

Furthermore, the camera image is correlated with sound that is selected by a selection circuit 220, i.e., sound that is collected by the built-in microphone 113 or the sound that is collected by the remote microphone 116 and entered through the transmission/reception circuit 216. The camera image and its correlated sound are processed by an image/audio processing circuit 217, and the results are recorded in a recording circuit (not shown). The image/audio processing circuit 217 performs various effect processes for adding or synthesizing text, a telop, an image and sound.

In the TV telephone mode, the sound selected by the selection circuit 220 is transmitted by the communication control circuit 202 through the modem 102 to the outside.

The CPU 203 controls the individual sections of the video camera 101. As a specific example, the CPU 203 controls the communication control circuit 202 in the TV telephone mode, or controls the image/audio processing circuit 217 in the effect image synthesization process. Further, when the state is changed from the normal photographing state to the facing photographing state, the CPU 203 also permits the LCD display control circuit 211 to perform the upside-down process and the mirror-image process for an image to be displayed on the LCD panel 103. The display change on the LCD panel 103 in the TV telephone mode will be described in detail later. Furthermore, the CPU 203 switches the selection circuit 219 and the section circuit 220. At this time, the CPU 203 determines whether the TV telephone mode is set and whether the remote controller 150 is employed, and appropriately switches the selection circuit 219 and the selection circuit 220 in accordance with the situation. The control processing performed by the CPU 203 in the TV telephone mode will be described later while referring to the flowchart in FIG. 12.

Various programs to be read by the CPU 203 and personal data, such as the telephone number of a communication partner, are stored in a memory 218.

The CPU 203 controls the individual sections in accordance with operating commands received from the trigger button 110 for instructing the photographing start/end for the main body, the menu switch 111 for changing the VCR mode/TV telephone mode, the on-hook button 112 for instructing the call start/end in the TV telephone mode, and the command keys 117 when they can be manipulated by the remote controller 150.

The operation in the TV telephone mode will now be explained. The image data obtained by the photographing element 207 through the lens 106 is processed by the camera signal processing circuit 208 into a camera image signal for display on the viewfinder 104 or the LCD panel 103. This camera signal is transmitted to the communication control circuit 202, and is encoded to reduce the amount of data. The resultant data, together with the audio data collected at the microphone 113, is transmitted to the communication partner.

The LCD display control circuit 211 receives a camera image signal from the camera signal processing circuit 208, and an image signal received and decoded by the communication control circuit 202.

The hinge 108, which has a pivoting function is provided for the portion whereat the LCD panel 103 is attached, and interacts with a switch 213 for selecting functions in accordance with the pivoting angle of the LCD panel 103. The switch 213 includes a contact 214 for detecting the positioning of the display face of the LCD panel 103 when it corresponds to that of the lens 106 (directed toward the object 107), and a contact 215 for detecting other positions. The so obtained detection results are transmitted to the CPU 203. It should be noted that the contacts 214 and 215 have respectively predetermined operating ranges.

When from the pivoting angle the CPU 203 detects that the position of the LCD panel 103 corresponds to the location of the contact 214 of the switch 213 (i.e., the facing photographing state has been entered), the CPU 203 permits the LCD display control circuit 211 to display on the LCD panel 103 an image received from the communication control circuit 202. At this time, the LCD display control circuit 211 performs the upside-down process and the mirror-image process for the image to be displayed.

When from the pivoting angle the CPU 203 detects that the position of the LCD panel 103 corresponds to the location of the contact 215 of the switch 213 (i.e., the normal photographing state has been entered), the CPU 203 permits the LCD display control circuit 211 to display on the LCD panel 103 the camera image received from the camera signal processing circuit 208.

Figure 9A:
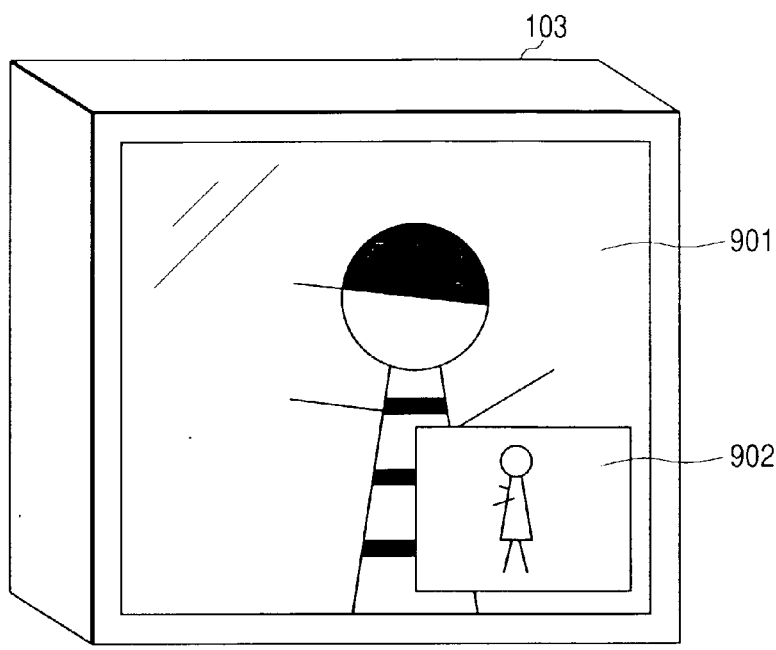
FIGS. 9A and 9B are diagrams showing example liquid crystal display panel 103 displays when the video camera 101 is used as a TV telephone.
Figure 9B:
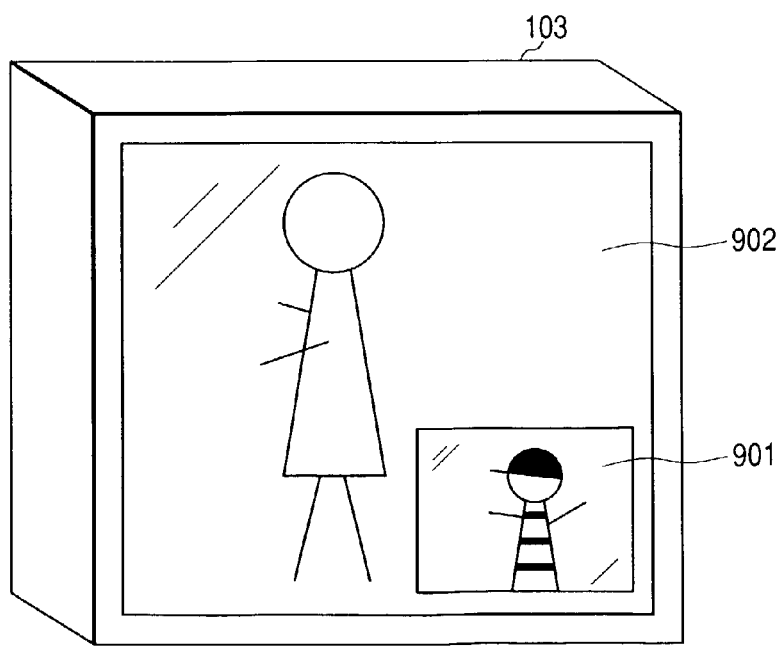

In the TV telephone mode, the image displayed on the LCD panel 103 can be changed as is shown in FIGS. 9A and 9B.

In FIG. 9A is shown an example LCD panel 103 displaying in the facing photographing state. In this example, as is shown in FIG. 9A, the image control circuit 211, using a so-called picture-in-picture format, synthesizes a camera image 902 with an image 901 received from the communication partner and displays the synthesized image. In FIG. 9A, to obtain an image to be displayed, the display control circuit 211 synthesizes the camera image with the received image and performs the upside-down process and the mirror-image process for the obtained image. Then, with the LCD panel 103 set in the facing photographing mode, the obtained image can be viewed from the object 107. When this display form is employed in the facing photographing state of the TV telephone mode, the image received from the communication partner is displayed as a parent picture, and the camera image is displayed as a child picture, a format that helps the user adjust the layout of the local camera.

In FIG. 9B is shown an example LCD panel 103 displaying in the normal photographing state. In this example, the LCD display control circuit 211, using the so-called picture-in-picture format depicted in FIG. 9A, synthesizes the image 901 received from the comniunication partner with the camera image 902 and displays the synthesized image. When this display form is employed in the normal photographing mode of the TV telephone mode, a desired object is photographed, and the camera image thereof is displayed as a parent picture, while the reaction of the communication partner can be monitored as a child picture.

Figure 10A:
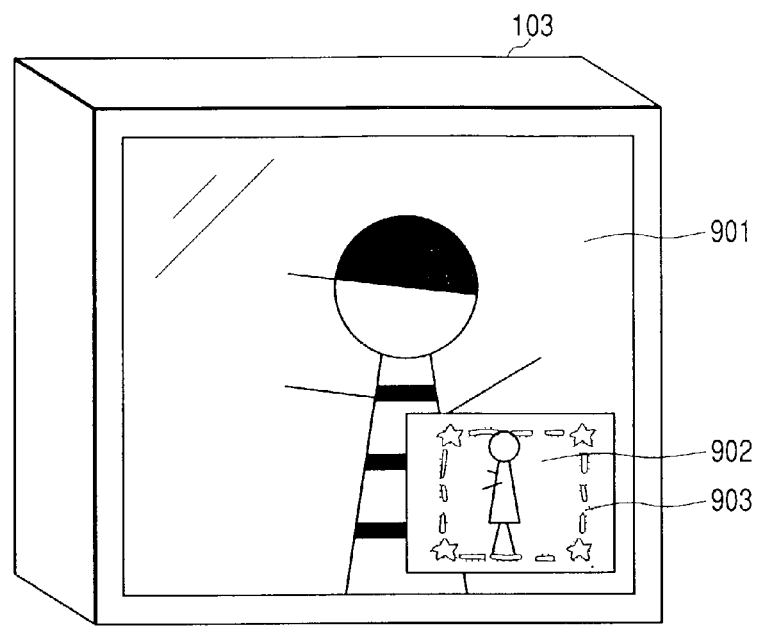
FIGS. 10A and 10B are diagrams showing example liquid crystal display panel 103 displays when the video camera 101 is employed as a TV telephone.
Figure 10B:
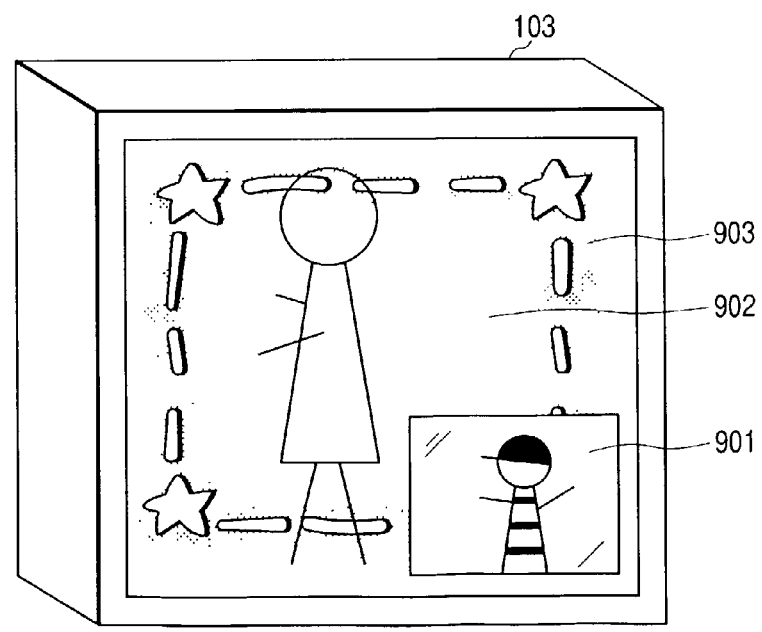

Further, the image displayed on the LCD panel 103 in the TV telephone mode may also be processed as is shown in FIGS. 10A and 10B.

An effect image shown in either FIG. 10A or 10B is one that has been synthesized with the camera image 902. The camera image 902 and the effect image 903 are synthesized by the image/audio processing circuit 217, which performs a synthesization process that can include not only a simple, multiple-image synthesization process, but also a chroma key synthesization process and a luminescence key synthesization process. Further, text and a telop can be added during the synthesization process.

In the same manner as was explained while referring to FIGS. 9A and 9B, as the camera image 902, which is synthesized with the effect image 903 by the image/audio processing circuit 217, the image in FIG. 10A can be displayed in the facing photographing state of the TV telephone mode, or the image in FIG. 10B can be displayed in the normal photographing mode.

As is described above, when the thus arranged video camera 101 is employed as a TV telephone and the user converses with a communication partner in the facing photographing state, the user can direct the display face of the LCD panel 103 (the display direction) and the lens 106 (the photographing direction) toward himself or herself, and either can display the image of the communication partner across the entire screen of the LCD panel 103 or can employ the picture-in-picture format to display the image of the communication partner as the parent picture and the camera image as the child picture.

On the other hand, when a scene or a person near a photographer is to be shown to the communication partner, the photographer directs the lens 106 toward the target and the LCD panel 103 toward himself or herself, and either can display the obtained camera image across the entire screen of the LCD panel 103 or can employ the picture-in-picture format to display the camera image as the parent picture and the image of the communication partner as the child picture.

Further, since the switching of the display forms interacts with a simple operation, i.e., the pivoting of the LCD panel 103, the employability is excellent.

Figure 12:
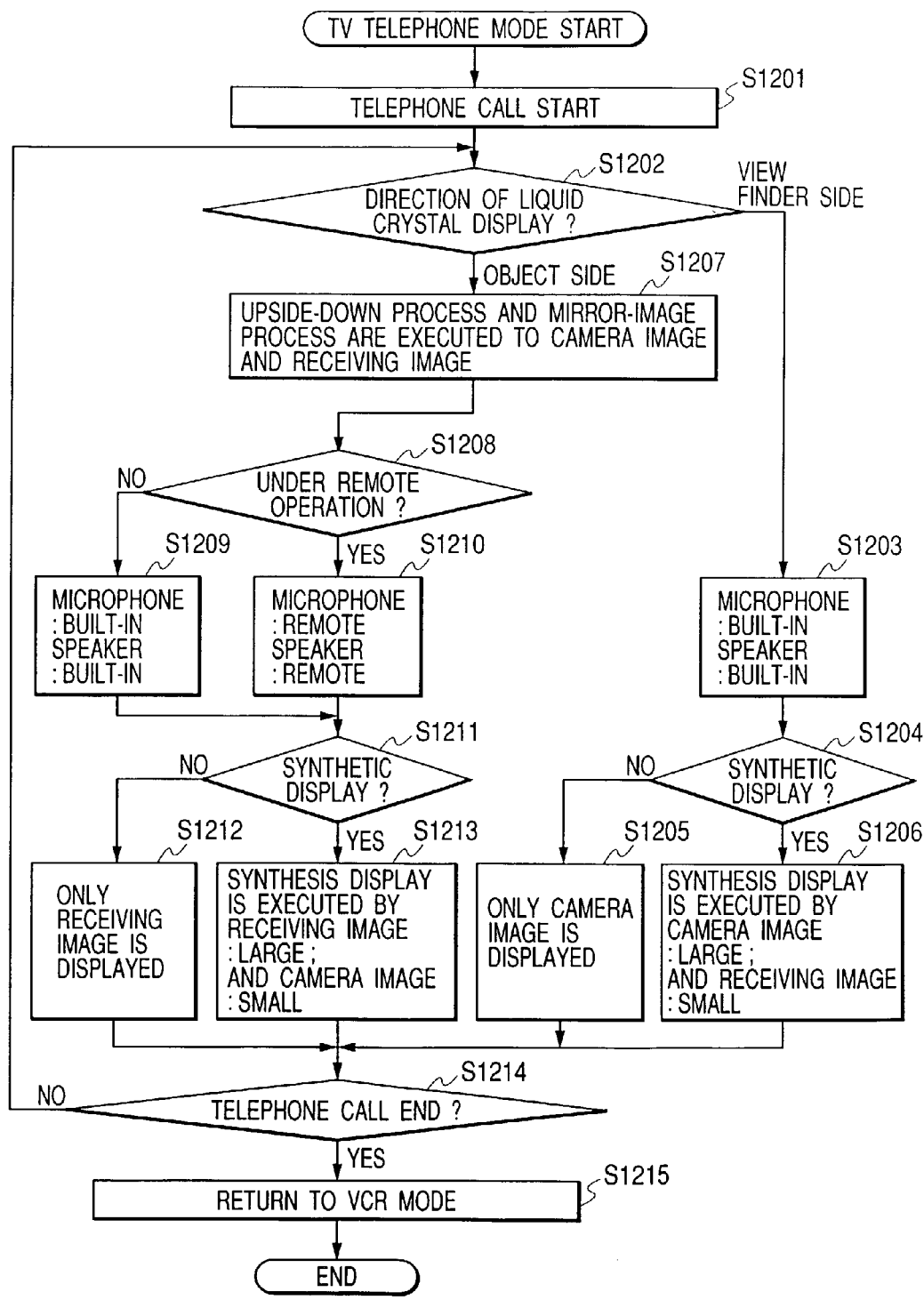
FIG. 12 is a flowchart showing the processing performed by the video camera 101 that is employed as a TV telephone.
Figure 13:
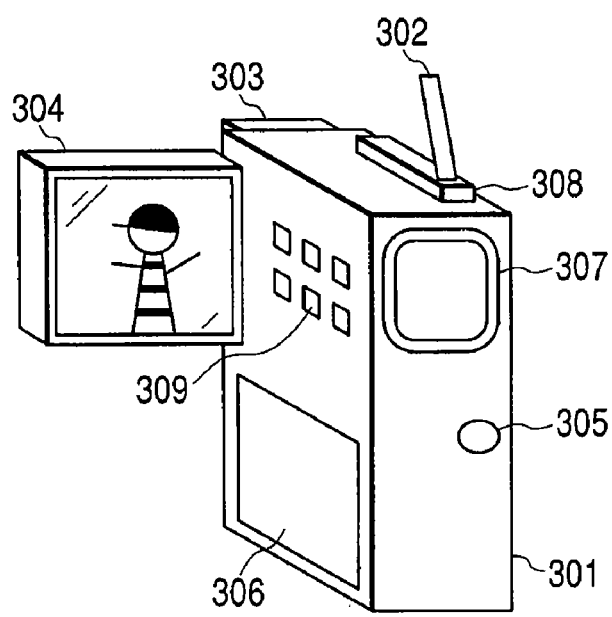
FIG. 13 is a diagram for explaining an example video camera that incorporates a communication function.

The operation of the video camera 101 in the TV telephone mode will now be explained while referring to the flowchart in FIG. 12. The flowchart in FIG. 12 is for the performance by the CPU 203 of a program stored in the memory 218.

First, while the TV telephone mode is designated by using the menu setup, the on-hook state is set by dialing a telephone number or by answering a telephone call and the communication process is initiated (step S1201). During the course of the telephone call, the positioning of the display face of the LCD panel 103 is determined (S1202).

When the display face is directed toward the viewfinder 104, i.e., in the normal photographing state, sound in the vicinity of the user is collected by the built-in microphone 113, and sound received from the communication partner is output by the built-in loudspeaker 105 (S1203).

Then, a check is performed to determine whether to perform synthesization of the camera image 902 and a received image to obtain an image for display on the LCD panel 103 (step S1204). This determination is made in accordance with an instruction entered by the user.

When it is ascertained at step S1204 that image synthesization is not to be performed, only the camera image for the scene that currently is being photographed is displayed (step S1205).

When, however, it is ascertained that a synthesized image is to be displayed, the picture-in-picture format is employed, and a synthesized image is displayed wherein the camera image is the parent picture and the image received from the communication partner is the child picture (step S1206).

When at step S1202 the display face is directed toward the object 107, i.e., in the facing photographing state, the upside-down process and the mirror-image process are preformed for the camera image and the image received from the communication partner (step S1207).

Then, a check is performed to determine whether the remote controller 150 has been powered on and can be used to remotely control the exchange of commands (step S1208).

When the remote controller 150 is not employed, sounds in the vicinity are collected by the built-in microphone 113, and sounds received from the communication partner are output by the built-in loudspeaker 105 (S1209).

However, when at step S1208 it is determined that the remote controller 150 is to be employed, sounds in the vicinity are collected by the remote microphone 116 provided for the remote controller 150, and sounds received from the communication partner are output by the remote loudspeakers 115 (S1210). A determination of whether to use either the remote microphone 116 or the loudspeakers 115 may also be made in accordance with an instruction entered by the user.

Following this, a check is performed to determine whether the received image and the camera image should be synthesized to obtain an image for display on the LCD panel 103 (step S1211). This determination is made in accordance with an instruction entered by the user.

When it is ascertained at step S1211 that image synthesization is not to be performed, only the image received from the communication partner is displayed (step S1212).

When it is ascertained at step S1211 that image synthesization is to be performed, the picture-in-picture format is employed, and in the synthesized image that subsequently is displayed, the image received from the communication partner is the parent picture and the camera image, of the scene that is presently being photographed, is the child picture (step S1213).

When an image is displayed at step S1205, S1206, S1212 or S1213, a check is performed to determine whether the telephone line has been disconnected by the user or the communication partner and the telephone call has ended (step S1214).

Then, if the telephone call has not been ended, the processing beginning at step S1202 is repeated. And if the telephone call has been ended, the TV telephone mode is automatically terminated and program control is shifted to the VCR mode (step S1215).

The processing in FIG. 12 is thereafter terminated.

In this embodiment, the TV telephone function has been implemented by using the memory card modem and radio communication. However, the communication system and its form are not limited to these. For example, a built-in communication terminal may be employed, while the TV telephone function can also be implemented by using wire communication.

As is described in the first embodiment, the display form of the video camera of the invention can be changed in the TV telephone mode, and since the display form can be selected by interacting with a simple operation, the pivoting of the LCD panel 103, a video camera can be provided for which the user employability is superior.

Second Embodiment

An example wherein the present invention is applied for a portable radio communication apparatus will now be described as a second embodiment.

Figure 8A:
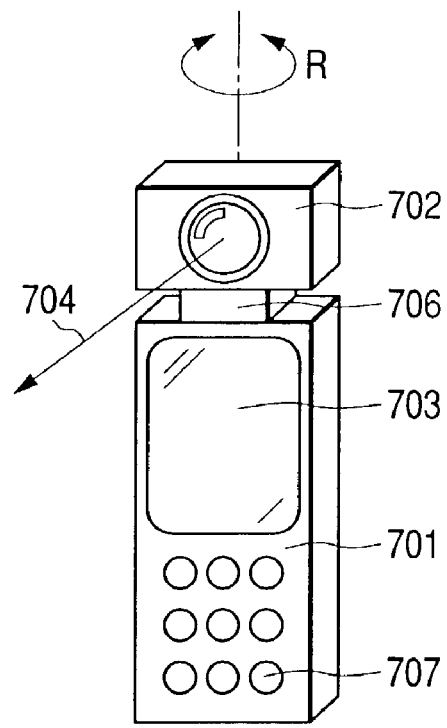
FIGS. 8A and 8B are diagrams showing the external appearance and the usage of a portable radio communication apparatus (a camera-mounted portable telephone 701) on which the camera according to this embodiment is mounted.
Figure 8B:
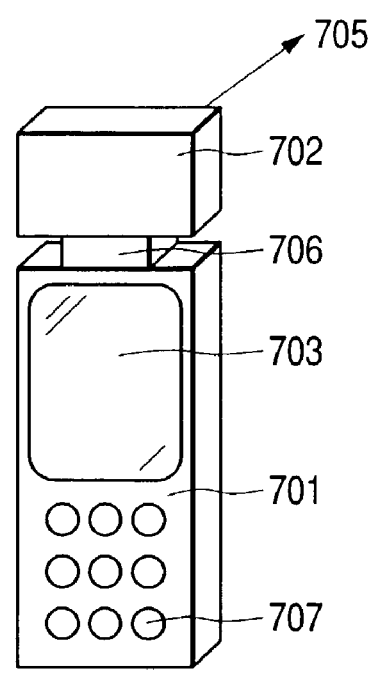

FIGS. 8A and 8B are diagrams showing a camera-mounted portable telephone that, in accordance with the embodiment, is a portable radio communication apparatus.

In FIGS. 8A and 8B, the camera-mounted telephone comprises: a main body 701, a camera 702, including a lens, a liquid crystal display portion 703, provided for the main body 701, and operating buttons 707 (ten keys and a menu button).

The camera 702 is pivotable at a hinge 706, in a part of the main body 701, in the directions indicated by an arrow R, and can be directed in the same direction (arrow 704) as is the liquid crystal display portion 703 or in the opposite direction (arrow 705). The camera 702 may be detached from the main body 701 at the hinge 706.

When the TV telephone function is provided by using the thus arranged portable telephone, and when, as is shown in FIG. 8A, the camera 702, in the TV telephone mode, is fixed in the direction indicated by the arrow 704, i.e., when the display direction of the liquid crystal display portion 703 corresponds to the photographing direction of the camera 702, an image received from a communication partner is displayed on the liquid crystal display panel 703.

When the camera 702, as is shown in FIG. 8B, is fixed in the direction indicated by the arrow 705, i.e., when the display direction of the liquid crystal display portion 703 does not correspond to the photographing direction of the camera 702, an image (a camera image) of a scene that currently is being photographed by the camera 702 is displayed on the liquid crystal display portion 703.

The operating principle for the display of the portable telephone in the second embodiment is the same as the relationship, explained in the first embodiment, between the photographing direction of the lens 106 of the video camera 101 and the display direction of the LCD panel 103. Furthermore, since the detection of the pivoting of the camera 702 at the hinge 706, and the employment of the means used for the operation and control of the sections of the main body 701 can be easily effected using the same configuration and methods as those employed for the video camera 101 in the first embodiment, no detailed explanations for them will be given.

Also in the second embodiment, the display form can be changed in the same manner as explained in the first embodiment while referring to FIGS. 9A and 9B and FIGS. 10A and 10B.

Furthermore, in the second embodiment, when the camera-mounted portable telephone is used as a TV telephone, characters can be entered by using the operation buttons 707 (e.g., ten keys) provided for the main body 701.

Figure 11A:
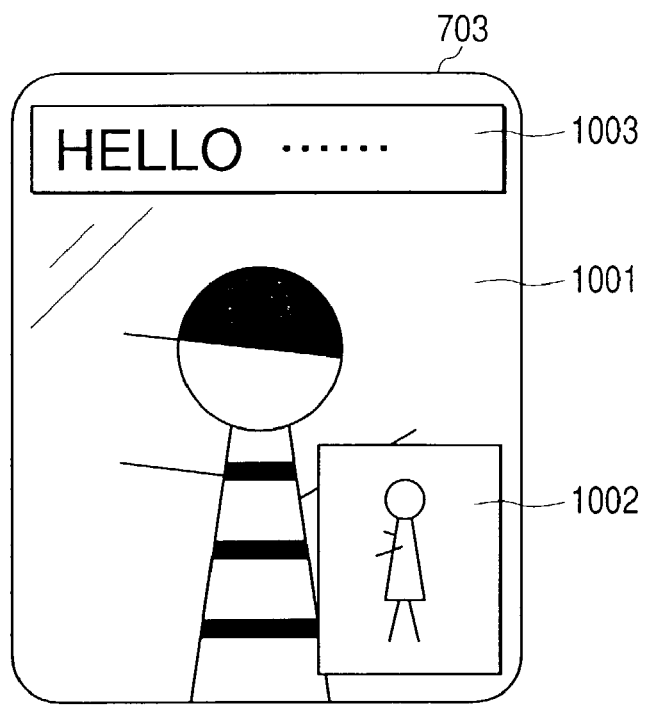
FIGS. 11A and 11B are diagrams showing example liquid crystal display panel 103 displays when the camera-mounted portable telephone 701 is employed as a TV telephone.
Figure 11B:
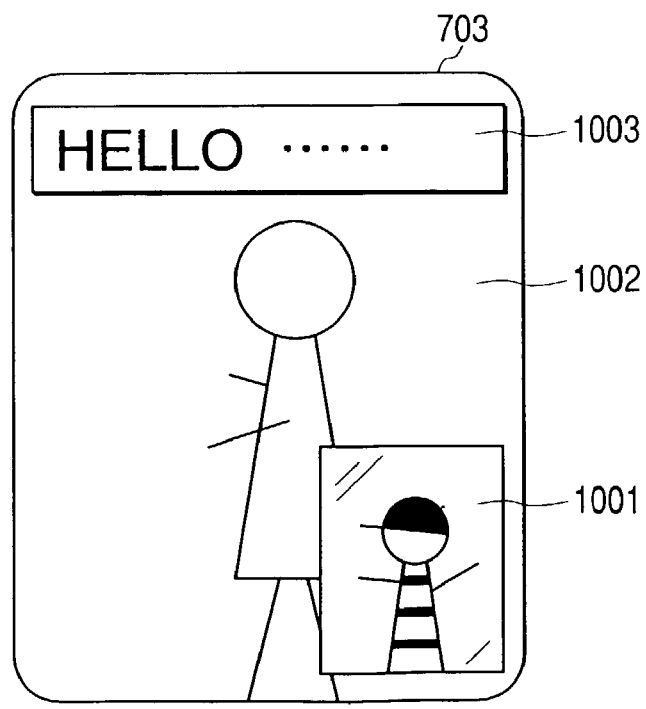

FIGS. 11A and 11B are diagrams in which example displays are shown on the liquid crystal display portion 703.

In the example in FIG. 1A, as is shown in FIG. 8A, the camera 702 is fixed in the direction indicated by the arrow 704 in the TV telephone mode, i.e, the display direction of the liquid crystal display portion 703 matches the photographing direction of the camera 702. In this state, as a preference, an image 1001 received from the communication partner is displayed on the liquid crystal display portion 703. Only the image 1001 may be displayed; however, as is shown in FIG. 11A, the image 1001 may be displayed as a parent picture in the picture-in-picture format, while a camera image 1002, of a scene that is currently being photographed, may be displayed as a child picture. In addition, to enter characters using the ten keys 707, a character input screen 1003 may be displayed for the entry of desired characters, and the input characters and the camera image may together be transmitted to the communication partner.

In the example in FIG. 11B, in the TV telephone mode, the camera 702 is fixed in the direction indicated by the arrow 705, as is shown in FIG. 8B, i.e., the display direction of the liquid crystal display portion 703 does not match the photographing direction of the camera 702. In this state, as a preference, the camera image 1002, of the scene that is being photographed, is displayed on the liquid crystal display portion 703. Only the camera image 1002 may be displayed; however, as is shown in FIG. 11b, the camera image 1002 may be displayed as a parent picture in the picture-in-picture format, while the image 1001 received from the communication partner may be displayed as a child picture. Furthermore, to enter characters using the ten keys 707, the character input screen 1003 may be displayed for the entry of desired characters, and the input characters and the camera image 1002 may together be transmitted to the communication partner.

As is described in the second embodiment, the display form of the portable telephone of the invention can be changed in the TV telephone mode, and since the display form can be selected by interacting with a simple operation, the pivoting of the camera 702, a portable telephone can be provided for which the employability for the user is superior.

Other Embodiment

The scope of the present invention also includes a configuration wherein, to achieve the functions of the embodiments, software program code that implements the functions of the embodiments is supplied to an apparatus or a system computer that is connected to various devices, and the devices can thereafter be operated in accordance with a program stored in the apparatus or in the computer (a CPU or an MPU) of the system.

In this case, the functions of the embodiments are provided by the software program code, and the program code constitutes the present invention. The transmission medium for the program code can be a communication medium (a wire line, such as an optical fiber, or a radio line) for a computer network system (a LAN, a WAN, such as the Internet, or a radio communication network) for transmitting and supplying program information as a carrier wave.

Furthermore, means for supplying the program code to the computer, such as a storage medium on which the program code is stored, also constitutes the present invention. The storage medium used for storing the program code can be, for example, a flexible disk, a hard disk, an optical disk, a magneto-optical disk, a CD-ROM, a magnetic tape, a nonvolatile memory card, or a ROM.

In addition, with the present invention it is not only possible for the functions of the previous embodiments to be provided through the execution of program code by a computer, but also, the program code can interact with an OS (Operating System), or with another software application, running on a computer to provide the functions described in the above embodiments.

Furthermore, with the present invention, program code read from a storage medium can be written in a memory that is mounted on a function expansion board inserted into a computer, or in a function expansion unit connected to the computer, and in consonance with instructions in the program code, a CPU mounted on the function expansion board, or in the function expansion unit, can perform part or all of the actual processing required to implement the functions of the above described embodiments.

The shapes and structures of the individual sections in the embodiments are merely examples for implementing the present invention, and the technical scope of the present invention should not be limited to them. That is, the present invention can be variously provided, in a variety of forms, without departing from the spirit or the essential feature of the invention. For example, in the above embodiments the video camera and the portable telephone have been employed as examples. However, the present invention can also be applied for an apparatus that can transmit and receive image data and audio data and that includes an image pickup unit and a display unit, either one of which is movable.

As is described above, according to the present invention, the functions of a display unit such as an LCD panel or a liquid crystal display portion, can be used to improve employability in a case wherein they are employed by users while viewing each others' faces, and for a case wherein mainly the scene and persons around a user (a photographer) are transmitted and provided for a communication partner.

What is claimed is:

1. An electronic apparatus comprising:
    photographing means for photographing an object;
    display means for displaying an image obtained by said photographing means and an external image received from the outside;
    movement means for rotatably connecting, via a hinge, said display means to a housing body to which said photographing means is provided fixedly, so that said display means can rotate in a plurality of directions;
    sound output means including a loudspeaker provided on a surface of said housing body on which said photographing means is also arranged, for outputting, to the direction of the object, an external sound received from the outside; and
    control means for, when said external image and said external sound are being received, switching said image and said external image to be displayed on said display means in accordance with a positional relationship between said photographing means fixedly held by said housing body and said display means rotated by said movement means, and continuing outputting said external sound from said sound output means regardless of switching between said image and said external image.

2. An electronic apparatus according to claim 1, wherein said movement means includes, at the least, a pivoting mechanism as one part of a configuration thereof.

3. An electronic apparatus according to claim 1, wherein, when it is ascertained that a photographing direction of said photographing means matches a display direction of said display means, said control means displays said external image on said display means.

4. An electronic apparatus according to claim 3, wherein, when it is ascertained that said photographing direction of said photographing means matches said display direction of said display means, said control means displays, on said display means, as a main picture said external image, and displays as a sub-picture said image obtained by said photographing means.

5. An electronic apparatus according to claim 1, wherein, when it is ascertained that a photographing direction of said photographing means does not match a display direction of said display means, said control means displays, on said display means, said image obtained by said photographing means.

6. An electronic apparatus according to claim 5, wherein, when it is ascertained that said photographing direction of said photographing means does not match said display direction of said display means, said control means displays, on said display means, as a main picture said image obtained by said photographing means, and displays as a sub-picture said external image that is received.

7. An image pickup apparatus comprising:
    photographing means for photographing an object;
    reception means for receiving an external image signal and an external sound signal;
    display means for displaying an image obtained by said photographing means and a received image concerned with said external image signal received by said reception means, wherein said display means is rotatably connected, via a hinge, to a housing body to which said photographing means is provided fixedly, so that said display means can rotate in a plurality of directions;
    sound output means including a loudspeaker provided on a surface of said housing body on which side said photographing means is also arranged, for outputting, to the direction of the object, a received sound concerned with said external sound signal received by said reception means; and
    control means for, when said reception means is receiving said external image signal and said external sound signal, switching said image and said received image to be displayed on said display means in accordance with a photographing direction of said photographing means fixedly held by said housing body and a display direction of said display means, changed when said display means is rotated via the hinge, and continuing outputting said received sound from said sound output means regardless of switching between said image and said received image.

8. An image pickup apparatus according to claim 7, wherein, when it is ascertained that said display direction of said display means matches said photographing direction of said photographing means, said control means displays said received image on said display means.

9. An image pickup apparatus according to claim 8, wherein, when it is ascertained that said display direction of said display means matches said photographing direction of said photographing means, said control means displays, on said display means, as a main picture said received image, and displays as a sub-picture said image obtained by said photographing means.

10. An image pickup apparatus according to claim 7, wherein when it is ascertained that said display direction of said display means does not match said photographing direction of said photographing means, said control means displays, on said display means, said image obtained by said photographing means.

11. An image pickup apparatus according to claim 10, wherein, when it is ascertained that said display direction of said display means does not match said photographing direction of said photographing means, said control means displays, on said display means, as a main picture said image obtained by said photographing means, and displays as a sub-picture said received image.

12. An image pickup apparatus according to claim 7, further comprising:
   transmission means for transmitting an image signal obtained by said photographing means and an sound signal obtained by a microphone to an external device, wherein said photographing means, said reception means and said transmission means are operated at the same time in a predetermined operating mode.

13. An image pickup apparatus according to claim 12, further comprising:
   image processing means for synthesizing an effect image and said image obtained by said photographing means, wherein a synthesized image obtained by said image processing means is capable of being displayed on said display means, and of also being transmitted by said transmission means to said external device in said predetermined operating mode.

14. An image pickup apparatus according to claim 13, wherein said predetermined operating mode is a TV telephone mode, and while in said TV telephone mode, said image signal and said sound signal can be transmitted in real time to said external device.

15. An image pickup apparatus according to claim 14, further comprising:
   a remote controller, used for entering a command from the outside, that includes means for outputting said sound signal and means for receiving said external sound signal.

* * * * *

UNITED STATES PATENT AND TRADEMARK OFFICE
CERTIFICATE OF CORRECTION

| | | |
|---|---|---|
| PATENT NO. | : 7,295,240 B2 | Page 1 of 1 |
| APPLICATION NO. | : 10/226856 | |
| DATED | : November 13, 2007 | |
| INVENTOR(S) | : Takashi Kobayashi et al. | |

It is certified that error appears in the above-identified patent and that said Letters Patent is hereby corrected as shown below:

Column 12, line 3, delete "FIG. 11A" and insert --FIG. 1A--

Column 15, line 14, delete "and an sound" and insert --and a sound--

Signed and Sealed this

Twenty-fifth Day of November, 2008

JON W. DUDAS
*Director of the United States Patent and Trademark Office*